US010789574B1

(12) United States Patent
Casale et al.

(10) Patent No.: US 10,789,574 B1
(45) Date of Patent: *Sep. 29, 2020

(54) SYSTEMS AND METHODS FOR REMOTE HUDDLE COLLABORATION

(71) Applicant: MASSACHUSETTS MUTUAL LIFE INSURANCE COMPANY, Springfield, MA (US)

(72) Inventors: Robert Casale, Bristol, CT (US); Abigail O'Malley, Brighton, MA (US); Kedzie Teller, Brookline, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/844,076

(22) Filed: Dec. 15, 2017

Related U.S. Application Data

(63) Continuation of application No. 14/733,176, filed on Jun. 8, 2015, now Pat. No. 9,846,859.

(60) Provisional application No. 62/008,916, filed on Jun. 6, 2014, provisional application No. 62/008,896, filed on Jun. 6, 2014, provisional application No. 62/008,937, filed on Jun. 6, 2014, provisional application No. 62/008,888, filed on Jun. 6, 2014, provisional application No. 62/008,948, filed on Jun. 6, 2014.

(51) Int. Cl.
*G06F 3/0481* (2013.01)
*G06Q 10/10* (2012.01)
*H04L 29/08* (2006.01)
*H04L 29/06* (2006.01)
*G06F 40/169* (2020.01)

(52) U.S. Cl.
CPC ......... *G06Q 10/103* (2013.01); *G06F 40/169* (2020.01); *H04L 65/403* (2013.01); *H04L 67/10* (2013.01)

(58) Field of Classification Search
CPC ... G06Q 10/103; G06F 3/0481; H04L 65/403; H04L 67/10
See application file for complete search history.

(56) References Cited

U.S. PATENT DOCUMENTS 7,062,511 B1  6/2006  Poulsen
7,802,207 B2  9/2010  Agboatwalla et al.
(Continued)

OTHER PUBLICATIONS

Final Office Action on U.S. Appl. No. 16/395,167 dated Jun. 22, 2020.

*Primary Examiner* — Anil K Bhargava
(74) *Attorney, Agent, or Firm* — Foley & Lardner LLP

(57) ABSTRACT

Systems and methods for remote huddle collaboration are disclosed. The huddle collaboration system may include a huddle management system which may include an authentication module, a data processing module, and a module manager, among other components. Huddle collaboration system may allow huddle members of a company to fully engage in remote huddle sessions through different kind of client computing devices, in a consistent way regardless of their location. The system may act as an alternative to traditional whiteboards, displaying, collecting, and storing information during an active huddle session, where this information may be available to the users in the form of one or more standard and/or custom sub-applications, according to the user's and/or project's requirements.

20 Claims, 6 Drawing Sheets

(56) References Cited

U.S. PATENT DOCUMENTS

| | | |
|---|---|---|
| 7,827,494 B1 | 11/2010 | Hedayatpour et al. |
| 8,072,439 B2 | 12/2011 | Hillis et al. |
| 8,181,115 B2 | 5/2012 | Irving |
| 8,407,576 B1 | 3/2013 | Yin et al. |
| 9,594,823 B2 | 3/2017 | Chaney et al. |
| 10,498,747 B1 | 12/2019 | Meaney et al. |
| 2003/0046401 A1* | 3/2003 | Abbott .................. G06F 9/451 709/228 |
| 2004/0107256 A1* | 6/2004 | Odenwald ............. H04L 29/06 709/205 |
| 2007/0078953 A1 | 4/2007 | Chai et al. |
| 2007/0240063 A1 | 10/2007 | Cheng et al. |
| 2008/0263024 A1 | 10/2008 | Landschaft et al. |
| 2009/0119280 A1 | 5/2009 | Waters et al. |
| 2009/0133069 A1 | 5/2009 | Conness et al. |
| 2009/0204906 A1* | 8/2009 | Irving .................... H04N 7/15 715/753 |
| 2009/0216634 A1 | 8/2009 | Peltonen et al. |
| 2010/0070881 A1* | 3/2010 | Hanson ................ G06Q 10/06 715/753 |
| 2010/0100626 A1 | 4/2010 | Allen et al. |
| 2010/0192072 A1 | 7/2010 | Spataro et al. |
| 2011/0022991 A1* | 1/2011 | Hillis .................... G06F 3/017 715/863 |
| 2011/0113348 A1 | 5/2011 | Twiss et al. |
| 2012/0110087 A1 | 5/2012 | Culver et al. |
| 2012/0124484 A1 | 5/2012 | Robinson et al. |
| 2012/0159359 A1 | 6/2012 | Ehrler et al. |
| 2012/0278738 A1 | 11/2012 | Kruse et al. |
| 2012/0290950 A1 | 11/2012 | Rapaport et al. |
| 2013/0091440 A1* | 4/2013 | Kotler .................. G06Q 10/10 715/753 |
| 2013/0218978 A1 | 8/2013 | Weinstein et al. |
| 2013/0254658 A1 | 9/2013 | Nestler et al. |
| 2014/0006977 A1 | 1/2014 | Adams |
| 2014/0033265 A1* | 1/2014 | Leeds .................... G06F 21/10 726/1 |
| 2014/0040257 A1 | 2/2014 | Chandrasekaran |
| 2014/0082525 A1 | 3/2014 | Kass et al. |
| 2014/0172485 A1 | 6/2014 | Thean |
| 2014/0181676 A1 | 6/2014 | Samborskyy et al. |
| 2014/0189618 A1 | 7/2014 | Meyer |
| 2014/0282106 A1 | 9/2014 | Smith et al. |
| 2014/0282135 A1 | 9/2014 | Segre |
| 2014/0298259 A1 | 10/2014 | Meegan et al. |
| 2014/0337778 A1 | 11/2014 | Armitage |
| 2015/0067058 A1* | 3/2015 | Vellozo Luz ........... H04L 67/14 709/204 |
| 2015/0089353 A1 | 3/2015 | Folkening |
| 2015/0095802 A1 | 4/2015 | Huang et al. |
| 2015/0120577 A1* | 4/2015 | Lobo .................... G06Q 10/103 705/301 |
| 2015/0149929 A1* | 5/2015 | Shepherd .............. H04L 65/403 715/753 |
| 2015/0229533 A1 | 8/2015 | Vida et al. |
| 2016/0100019 A1 | 4/2016 | Leondires |
| 2019/0114334 A1 | 4/2019 | Gunther |
| 2019/0287188 A1 | 9/2019 | Colafranceschi |

* cited by examiner

SYSTEMS AND METHODS FOR REMOTE HUDDLE COLLABORATION

CROSS-REFERENCE TO RELATED APPLICATIONS

This application is a continuation of co-pending U.S. patent application Ser. No. 14/733,176, filed Jun. 8, 2015, entitled "SYSTEMS AND METHODS FOR REMOTE HUDDLE COLLABORATION," which claims priority to U.S. Provisional Patent Application Ser. No. 62/008,888, filed Jun. 6, 2014, U.S. Provisional Patent Application Ser. No. 62/008,896, filed Jun. 6, 2014, U.S. Provisional Patent Application Ser. No. 62/008,916, filed Jun. 6, 2014, U.S. Provisional Patent Application Ser. No. 62/008,937, filed Jun. 6, 2014, and U.S. Provisional Patent Application Ser. No. 62/008,948, filed Jun. 6, 2014, all of which are hereby incorporated by reference in their entirety.

TECHNICAL FIELD

The present disclosure relates in general to collaboration systems, and more specifically to systems and methods for remote huddle collaboration.

BACKGROUND

Conventionally, team members working on one or more projects within a company may get together in a huddle or micromeeting on a regular basis to share information, discuss topics, evaluate performance, identify issues, and/or solve problems collaboratively. Since the introduction of the huddle, whiteboards have acted as the traditional tool for storing all information collected during an active huddle session. However, one drawback of the current huddle methodology is that it may not be possible for all participants in a meeting to be in the same physical location at the same time.

Alternatives to overcome the challenge of gathering team members who may be at different locations for a huddle, may include the use of one or more collaboration tools such as conference phone calls, video conferences, Internet relay chat (IRC), email, and instant messaging, among others. Nevertheless, the whiteboard is still the most commonly used tool during huddles, because the aforementioned collaboration tools are generic ways to connect people and may not offer a consistent way to realize the benefits of the team huddle. As a result, all team members must be physically located in the same room in order to be fully engaged in the huddle session.

Conventional approaches to meetings amongst remote users fail address all of the deficiencies of the conventional collaboration tools. A web meeting may allow a user to share a computer desktop with another user in a remote location. But the user must select which application should be presented on the computer desktop, so there is no ability to present a page that has information from multiple sub-applications that are dynamically updated. Further, the user cannot include annotations overlaid on the page that are simultaneously presented to the remote user and also stored with that particular page such that the particular page can be retrieved at a later date along with those annotations.

Moreover, conventional extranets are capable of sharing information from a common source, but these extranets do not offer real-time collaboration through real-time updates and simultaneous displays to other users. Further, these conventional extranets do not utilize sub-applications that dynamically display data associated with users simultaneously accessing the extranet. Conventional computer solutions do not offer the desired collaboration, real-time updating, dynamic presentation of data, and linking of additional content to the displayed data.

Therefore, there is a need for systems and methods which may enable remote huddle collaboration between team members of a given project that may overcome these and other drawbacks.

SUMMARY

The present disclosure describes systems and methods for remote huddle collaboration.

According to an embodiment, a computer-implemented huddle collaboration system may include different components which may dynamically interact with each other through network connections. The huddle collaboration system may include one or more internal databases operatively coupled to a huddle management system, among other components. The huddle management system may include one or more authentication modules, one or more data processing modules, and one or more module managers, among other software modules. The huddle collaboration system may also include any suitable user interface through which users, such as huddle leaders and huddle participants, may interact with the huddle management system by means of a computing device. The computing device may be any computer type device that may receive, process, and/or transmit digital data including a bus which may enable the communication between components such as input/output devices, an interface, a memory, a storage device, and a central processing unit (CPU), among others.

According to another embodiment, a computer-implemented method for remote huddle collaboration may allow users to perform actions for accessing the huddle collaboration system, entering the user's credentials, entering the user's huddle boards, selecting a huddle board, and entering the huddle board summary. If the user is joining a huddle board as a leader, then the method may also allow a leader to perform actions for selecting "start" a huddle session, entering the huddle board, conducting the huddle board by selecting one or more sub-applications to edit/view the content in the huddle board, ending the huddle session, and exiting the huddle collaboration system, among others. If the user is joining a huddle board as a participant, then the method may allow a participant to perform actions for selecting "join" a huddle session, entering a waiting state for the huddle session until the huddle is active or entering the huddle board if the huddle is already active, engaging in the huddle session, ending the huddle session, and exiting the huddle collaboration system, among others. If the user is not joining a huddle board but wants to edit/view the content in a huddle board, then the method may allow users to perform actions for selecting one or more sub-application to edit/view the content in the huddle board, and exiting the huddle collaboration system, among others.

According to a further embodiment, a computer-implemented huddle summary user interface may enable one or more users to view/edit the content in one or more sub-applications in the huddle board, where the huddle leader may control the sub-applications that the huddle participants may access in the huddle and the viewing and/or editing rights they may have over the content in each of the sub-applications. The huddle summary may include sub-applications which may be standard for every user's huddle and others which the user may decide should be shown, according to the user's and/or project's requirements. The huddle summary may also include a huddle-up menu which may enable users to join a huddle board in an active session and to access a sub-applications library that may allow users to add one or more sub-applications to the huddle board, among other features. When a user joins an active huddle, the huddle leader may start the huddle and then, conduct the huddle by viewing and/or editing the content in it, while simultaneously huddle participants engage in the huddle session by viewing and/or editing the content as needed. In an additional embodiment, a huddle member may join an active huddle session as a note taker, who may be responsible for taking notes of the information generated during an active huddle session.

Systems and methods for remote huddle collaboration may enable huddle members to remotely connect to huddles in a consistent way, which may reinforce the company's management system approach across multiple levels in the organization. In addition, the system may promote a clear alignment of goals and strategies while enhancing the productivity of the huddle and leveraging the human and information technology resources.

In one embodiment, a computer-implemented method comprises receiving, by an authentication module of a huddle management server, a user credential of a first user transmitted from a computing device of the first user; authenticating, by the authentication module of the huddle management server, the user credential of the first user; determining, by the authentication module of the huddle management server, which huddle collaboration files are associated with the first user; granting, by the authentication module of the huddle management server, access to the first user for the huddle collaboration files associated with the first user upon authentication of the user credential; receiving, by a data processing module of the huddle management server, a selection by the user of a huddle collaboration file associated with the first user; designating, by the data processing module of the huddle management server, the selected huddle collaboration file as an active huddle; receiving, by the authentication module of the huddle management server, a user credential of a second user transmitted from a computing device of the second user; authenticating, by the authentication module of the huddle management server, the user credential of the second user; determining, by the authentication module of the huddle management server, which huddle collaboration files are associated with the second user; granting, by the authentication module of the huddle management server, access to the second user for the huddle collaboration files associated with the second user upon authentication of the user credential; determining, by the authentication module of the huddle management server, whether any of the huddle collaboration files associated with the second user are designated as an active huddle; identifying, by a data processing module of the huddle management server, at least two sub-applications associated with the selected collaboration file designated as the active huddle; instructing, by the data processing module of the huddle management server, execution of each of the at least two sub-applications associated with the selected collaboration file, wherein each of the sub-applications dynamically queries a database for data records associated with the first and second users; presenting, by the data processing module of the huddle management server, a graphical representation of the selected huddle collaboration file on the computing device of the first user, wherein the graphical representation comprises an initial view of the at least two sub-applications having a first set of information for each of the least two sub-applications simultaneously displayed in the graphical representation; simultaneously presenting, by the data processing module of the huddle management server, a synchronized version of the selected huddle collaboration file on a computing device of the second user located remotely from the computing device of the first user, wherein the graphical representation comprises the initial view of the at least two sub-applications having the first set of information for each of the least two sub-applications simultaneously displayed in the graphical representation; upon receiving a selection of one of the at least two sub-applications from the computing device of the first user or the computing device of the second user, presenting, by the data processing module of the huddle management server, a second graphical representation of the selected huddle collaboration file on the computing device of the first user, wherein the second graphical representation comprises a second view of the selected sub-application having a second set of information associated with the selected sub-application displayed in the second graphical representation; and simultaneously presenting, by the data processing module of the huddle management server, the second graphical representation of the selected huddle collaboration file on the computing device of the second user, wherein the second graphical representation comprises the second view of the selected sub-application having the second set of information associated with the selected sub-application displayed in the second graphical representation; and upon receiving input data from an input device of the computing device of the first user or the second user, presenting, by the data processing module of the huddle management server, the input data as an overlay on the first graphical representation or the second graphical representation that was being displayed when the input data was received by the huddle management server; and associating, by the data processing module of the huddle management server, the input data with the first graphical representation or the second graphical representation that was being displayed when the input data was received by the huddle management server.

In another embodiment, a collaboration system comprises a data store including a description associated with a huddle board display page having at least two sub-applications and an association with more than one user, wherein the first huddle board display page has information from a first sub-application and a second sub-application, and wherein the huddle board display page has a first huddle board display page having a first link associated with an object of the information from the first sub-application for a second huddle board display page having information from a first sub-application a second link associated with an object of the information from the second sub-application for a third huddle board display page having information from a second sub-application; and a computer processor coupled to the data store and in communication through the Internet and programmed to: receive a signal indicating activation of the first or second links displayed by the first huddle board display page or the second huddle board display page, upon receiving an indication that a sub-application has been activated by a user computer in Internet communication with the first huddle board display page, serve the second huddle board display page based upon the description in the data store and with content generated by the activated sub-application, and upon receiving an input from the user computer to annotate the huddle board display page, serve a third huddle board display page based upon the description in the data store, content generated by any sub-applications associated with the huddle board display page, and the input presented as an overlay on the huddle board display page.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
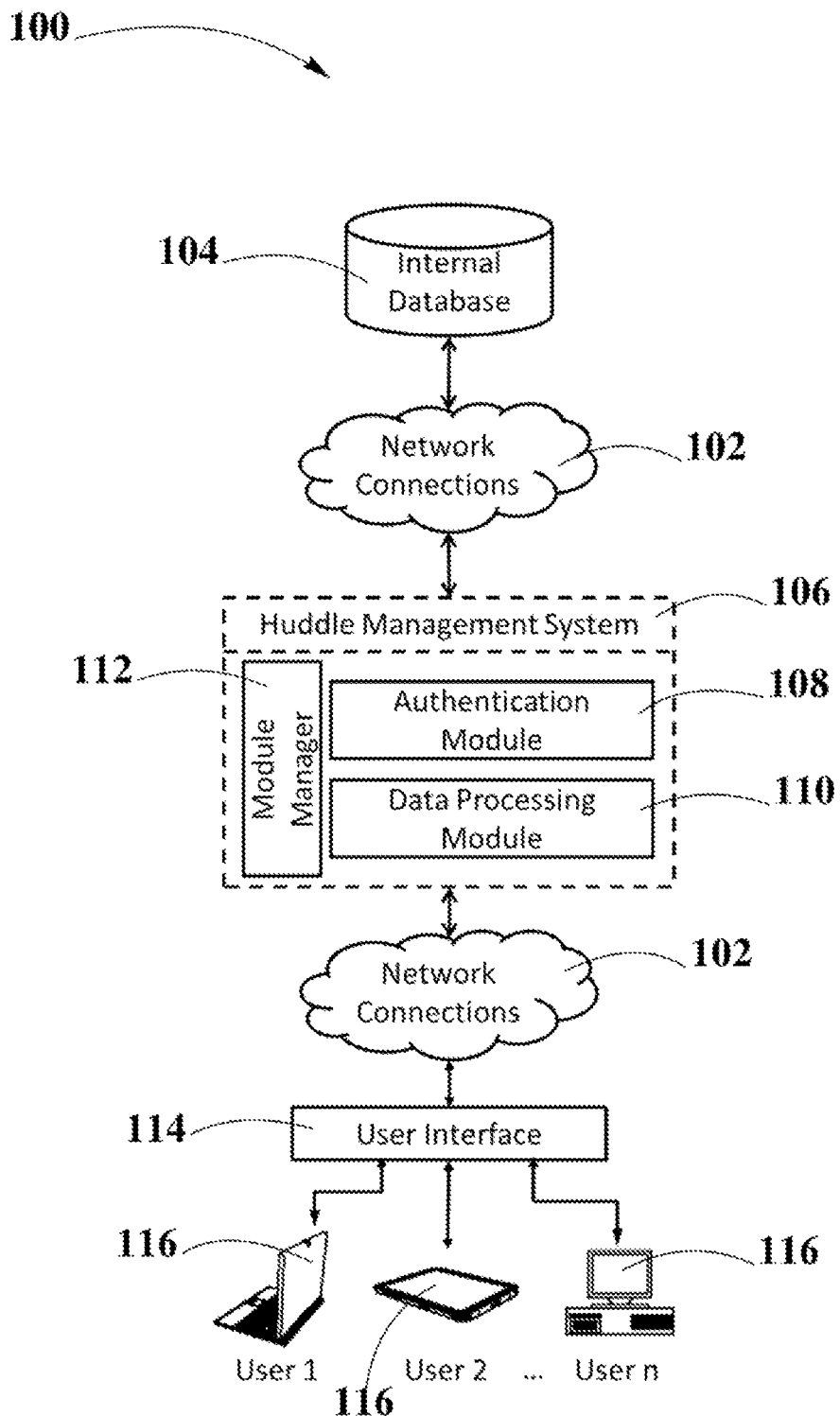
FIG. 1 shows a system architecture for a remote huddle collaboration system, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used herein, the following terms have the following definitions:

"Huddle" refers to a group of two or more members of a team, brought together on a regular basis to recognize outstanding contributions, evaluate performance, identify issues, and solve problems collaboratively.

"Huddle board" refers to a user interface generated by a huddle collaboration system which may display the content collected during a huddle in the form of one or more sub-applications.

"User's Huddle Boards" refers to a user interface generated by a huddle collaboration system which may display a list of huddle boards in which the user may be participating in, and a list of public boards which may be viewed by anyone in the company.

"Active Huddle" refers to a huddle board which a leader may have started and to which one or more participants may join remotely through a huddle collaboration system.

"Team Member" refers to a user that may participate in a remote huddle collaboration by means of a computing device. The user may be part of the team performing tasks of a particular project.

"Leader" refers to a team member that may initiate and manage a huddle session. A leader may have an additional set of permissions that may include for example, the ability to create huddle boards, configure or otherwise modify a huddle session, among others.

"Sub-application" refers to a software tool that may enable remote collaboration between authenticated team members in a digital huddle environment.

"Huddle summary" refers to a user interface generated by a huddle collaboration system which may show one or more sub-applications in the huddle board, and each sub-application may display a summary-level view of the data it may contain.

The present disclosure describes systems and methods for remote huddle collaboration. The system may enable participants to fully engage in huddles regardless of their location, such as at least two team members in different rooms, offices, floors, buildings, counties, states, or countries. The system may collect and store information during an active huddle session, replacing traditional whiteboards, where this information may be available to the users in the form of one or more sub-applications.

FIG. 1 shows a system architecture 100 for a remote huddle collaboration system, according to an embodiment. The disclosed system architecture 100 may include different components which may dynamically interact with each other through network connections 102. Network connections 102 may refer to any suitable connection between computers, such as for example intranets, local area networks (LAN), virtual private networks (VPN), wireless area networks (WAN), and the internet, among others.

System architecture 100 may include one or more internal databases 104 and a huddle management system 106, among other components. Internal database 104 may store data generated by one or more software modules operating within huddle management system 106, data and files uploaded by a user such as a huddle leader or a huddle participant, and the credential of each authorized user of the company to allow each authorized user to access and modify huddle boards, among others. Internal database 104 may grant access to huddle management system 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data. Internal database 104 may include huddle collaboration files, which are records that store information about a huddle board, sub-applications associated with the huddle board, whether the huddle board is an active huddle board, which users are associated with the huddle board, any positions or roles of the users associated with the huddle board, and information about the look and feel of how to present the huddle board on a display.

Huddle management system 106 may be operatively coupled to internal database 104 through network connections 102, and may include one or more authentication modules 108, one or more data processing modules 110, one or more module managers 112, and any other suitable software module required for the proper operation of huddle management system 106. Each software module within huddle management system 106 may include a processing unit for running related algorithms or computer executable program instructions that may be executed by a server, a single computer, or multiple computers in a distributed configuration; and may be configured to interact with one or more software modules of the same or different type operating within huddle management system 106. Each processing unit may include a processor with computer-readable medium, such as a random access memory (RAM) coupled to the processor. Examples of a processor may include a microprocessor, an application specific integrated circuit (ASIC), and a field programmable object array (FPOA), among others.

Huddle management system 106 may generate a suitable user interface 114 on a client computing device 116 through which a user, such as a huddle leader and/or a huddle participant, may interact with one or more software modules operating within huddle management system 106. Client computing device 116 may be any computer type device such as smartphones, desktop computers, laptop computers, tablets, PDAs, and/or another type of processor-controlled device that may receive, process, and/or transmit digital data. In addition, user interface 114 may be configured to collect information from one or more internal databases 104, and receive and/or feed information to one or more users interacting with client computing device 116.

According to some embodiments of the present disclosure, huddle management system 106 may generate user interface 114 which may request and/or collect information from one or more client computing devices 116 through which users may interact with user interface 114 via an input device, such as a touch screen, a mouse, a keyboard, a keypad, and others. Authentication module 108 may receive the user's credentials through client computing device 116 and may validate those credentials in order to assign permission to access, start, edit, and/or manage one or more huddle boards and/or sub-applications in the huddle board. Data processing module 110 may receive and process information collected during an active huddle session, and may store this information in internal database 104 when needed. Data processing module 110 may also be configured to automatically retrieve information requested by one or more client computing devices 116 and/or one or more software modules, where this information may be obtained from internal database 104 and/or the suitable operation of one or more software modules within huddle management system 106. Module manager 112 may interact with one or more software modules operating within huddle management system 106, in addition to controlling the operation of huddle collaboration system and processing requests from one or more client computing devices 116 and/or one or more software modules, among other activities. Huddle management system 106 may generate user interface 114 which may display the content in a huddle to one or more users in the form of one or more sub-applications. Internal database 104 may store any suitable data generated from the operation of one or more software modules within huddle management system 106 and may make it available for further analysis performed by one or more software modules within huddle management system 106, and/or one or more users.

Figure 2:
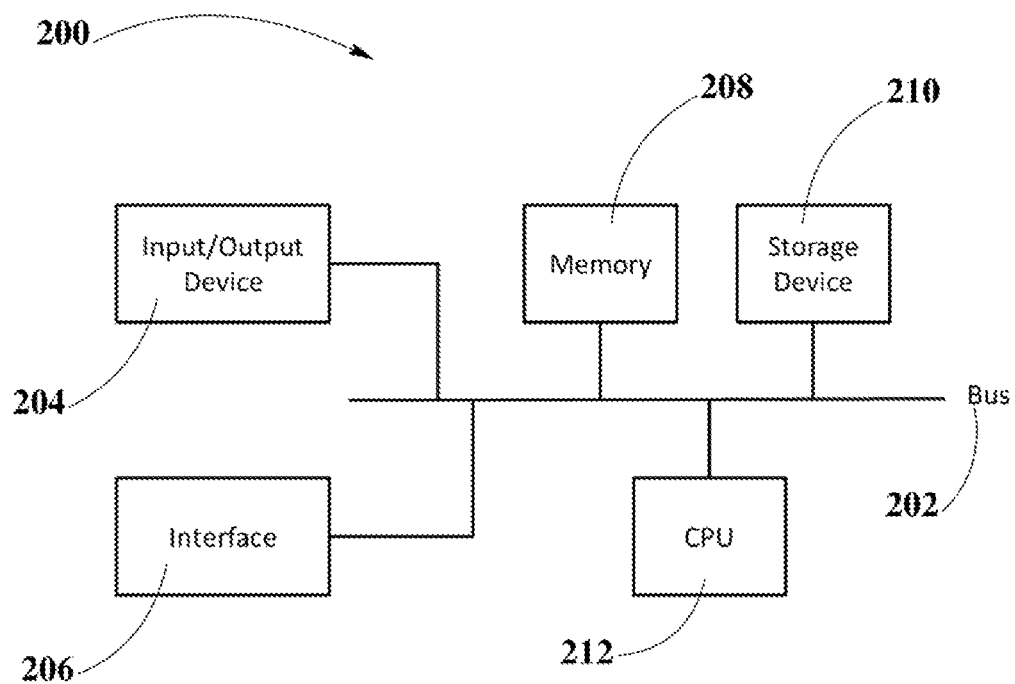
FIG. 2 is a block diagram of example components in a computing device, in which one or more embodiments of the present disclosure may operate.

FIG. 2 is a block diagram of example components in a computing device 200, in which one or more embodiments of the present disclosure may operate.

According to some aspects of this embodiment computing device 200 may correspond to a server, a client computing device, a smartphone, a desktop computer, a laptop computer, a tablet, a PDA, and/or another type of processor-controlled device that may receive, process, and/or transmit digital data, among others. Computing device 200 may include a bus 202, an input/output device 204, an interface 206, a memory 208, a storage device 210, and a central processing unit (CPU) 212. In another embodiment, computing device 200 may include additional, fewer, different, and/or differently arranged components than are illustrated in FIG. 2.

Bus 202 may include a path which may allow components within computing device 200 to communicate with each other. Input/output device 204 may include peripherals and/or other mechanisms that may enable a user to input information to computing device 200, including for example a keyboard, a mouse, a button, a touch screen, voice recognition, and biometric mechanisms, among others. Input/output device 204 may also include a mechanism that may output information to the user of computing device 200 such as, for example, a display, a light emitting diode (LED), and a speaker, among others. Interface 206 may include mechanisms that may enable computing device 200 to communicate with other computing devices 200 and/or systems through network connections. Network connections may refer to any suitable connections between computers such as, for example, intranets, local area networks (LAN), virtual private networks (VPN), wireless area networks (WAN) and the internet among others. Memory 208 may include a random access memory (RAM) or another type of dynamic storage device 210 which may store information and instructions for execution by central processing unit (CPU) 212. Storage device 210 may include a magnetic and/or optical recording medium such as read-only memory, flash memory, ferroelectric RAM (F-RAM) hard disks, floppy disks, and optical discs, among others. Central processing unit (CPU) 212 may include a microprocessor, an application specific integrated circuit (ASIC), or field programmable object array (FPOA), among others, which may interpret and execute instructions.

According to some embodiments of the present disclosure, at least one computing device 200 may perform certain operations to conduct huddles digitally required for the proper operation of a huddle collaboration system. Computing devices 200 may perform these operations in response to central processing unit (CPU) 212 executing software instructions that may be contained in a computer-readable medium, such as memory 208.

The software instructions may be read into memory 208 from another computer-readable medium, such as storage device 210, or from another computing device 200 via interface 206. The software instructions contained in memory 208 may cause central processing unit (CPU) 212 to perform one or more suitable processes which may be further described later. Alternatively, hardwired circuitry may be used in place of or in combination with software instructions to implement processes described herein. Thus, implementations described herein are not limited to any specific combination of hardware circuitry and software.

Figure 3:
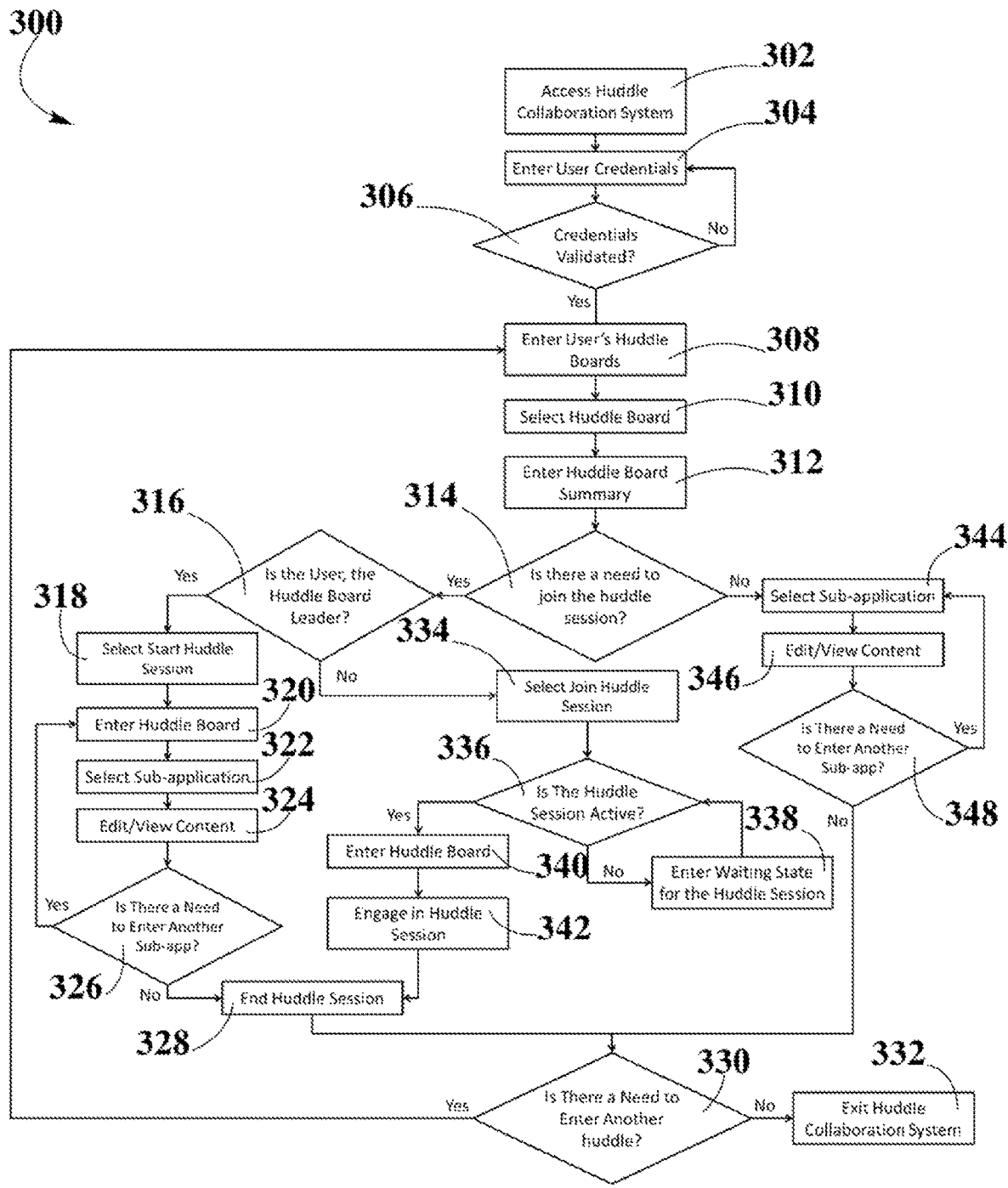
FIG. 3 is a flowchart of a method for remote huddle collaboration, according to another embodiment.

FIG. 3 is a flowchart of a method 300 for remote huddle collaboration, according to another embodiment.

Method 300 for remote huddle collaboration may be executed, for example, by a huddle collaboration system as shown in FIG. 1, which may include different components that may dynamically interact with each other through network connections.

Method 300 for remote huddle collaboration may start at step 302, when a user, such as a huddle leader or a huddle participant within a company, may launch a website of a huddle collaboration system through a client computing device. This huddle collaboration system may generate a login screen as an initial user interface, through which the user may enter his/her company's credentials at step 304, via an input device such as a touch screen, a mouse, a keyboard, a keypad, and others. If authentication module operating within huddle management system of huddle collaboration system can validate the user's credentials at step 306, then at step 308, huddle collaboration system may display the user's huddle boards that may show a list of the huddle boards in which the user may be participating in and a list of public boards, where these public boards may be viewed by anyone in the company and may be edited only by authorized users. The user's huddle boards may also provide the user with a feature which may allow the user to search for public huddle boards that may not be displayed in the list and for which they may have authorized access, and a feature which may allow authorized users to create a new huddle board. At step 306, if authentication module can not validate the user's credentials, then huddle collaboration system may request the user to enter his/her credentials at least one more time at step 304.

At step 310, users, such as a huddle leader and a huddle participant of a company, may select a huddle board they may wish to participate in from their huddle board list via an input device, and then at step 312, huddle collaboration system may display a huddle summary of the selected board. This huddle summary may show all the sub-applications in the huddle board, and each sub-application may display a summary-level view of the data it may contain. Sub-applications that may be shown in the user's huddle summary may be one or a combination of text-based, image-based, or numeric-based, and may include, but is not limited to, recognition, morale, announcements, key projects, dates/calendar, key metrics, company news, leader standard work, employee sentiment, and customer sentiment.

At step 314, the user may evaluate whether there is a need to join the selected huddle in an active session. If there is a need to join a huddle in an active session, then at step 316, the user may evaluate whether he/she may wish to enter the selected huddle board as a leader or as a huddle participant. If the user may wish to enter the selected huddle board as a leader at step 316, then at step 318, the huddle leader may select a "start" huddle option which may be available on a huddle-up menu of the selected board's huddle summary via an input device. Next, at step 320 huddle management system may allow the huddle leader to enter the huddle board to conduct the huddle session. In the huddle board, the huddle leader may have access to view and/or edit the content in the huddle which may be available to the huddle leader in the form of one or more sub-applications according to the user's and/or project's requirements. At step 322, the huddle leader may select one of the available sub-applications in order to edit and/or view further details of the content in the selected sub-application at step 324. Afterwards, if there is a need to enter another sub-application at step 326, then at step 320, huddle management system may display the huddle board to the huddle leader enabling the huddle leader to select another sub-application at step 322. If there is no need to enter another sub-app at step 326, then the huddle leader may end and leave the huddle session at step 328. Subsequently at step 330, the huddle leader may determine whether there is a need to enter another huddle board. If there is a need to enter another huddle at step 330, then huddle management system may display the user's huddle boards at step 308, which may allow the huddle leader to select another huddle board at step 310. Otherwise, the huddle leader may exit huddle collaboration system at step 332, and method 300 may end.

However, if the user may wish to enter the selected huddle board as a participant at step 316, then at step 334, the participant may select the "join" huddle option which may be available on the huddle-up menu of the selected board's huddle summary via an input device. Then at step 336, authentication module may determine whether the huddle leader has started the huddle session. If the huddle leader has not started the huddle session, module manager operating within huddle management system of huddle collaboration system may enable the huddle participant to enter a waiting state for the selected huddle at step 338, until the huddle leader starts the huddle session at step 318. Otherwise, huddle management system may allow the huddle participant to enter the huddle board at step 340 and engage in the huddle session at step 342. In the huddle board, the huddle participant may have access to view/edit the content in the huddle which may be available to the huddle participant in the form of one or more sub-applications according to the participant's permissions and/or the project's requirements. After the huddle session may have ended at step 328, the huddle participant may leave the huddle board. Subsequently at step 330, the huddle participant may determine whether there is a need to enter another huddle board. If there is a need to enter another huddle at step 330, then huddle management system may display the user's huddle boards at step 308, which may allow the huddle participant to select another huddle board at step 310. Otherwise, the huddle participant may exit huddle collaboration system at step 332, and method 300 may end.

Alternatively, at step 314, if there is no need to join a huddle in an active session, then the user may have access to view and/or edit the content in the huddle which may be available to the user in the form of one or more sub-applications according to the user's and/or project's requirements. At step 344, the user may select one of the available sub-applications in order to edit and/or view further details of the content in the selected sub-application at step 346. Afterwards, if there is a need to enter another sub-application at step 348, then at step 344, huddle management system may display the huddle board to the user enabling the user to select another sub-application at step 346. If there is no need to enter another sub-application at step 348, but there is a need to enter another huddle at step 330, then huddle management system may display the user's huddle boards at step 308, which may allow the user to select another huddle board at step 310. Otherwise, the user may exit huddle collaboration system at step 332, and method 300 may end.

Figure 4:
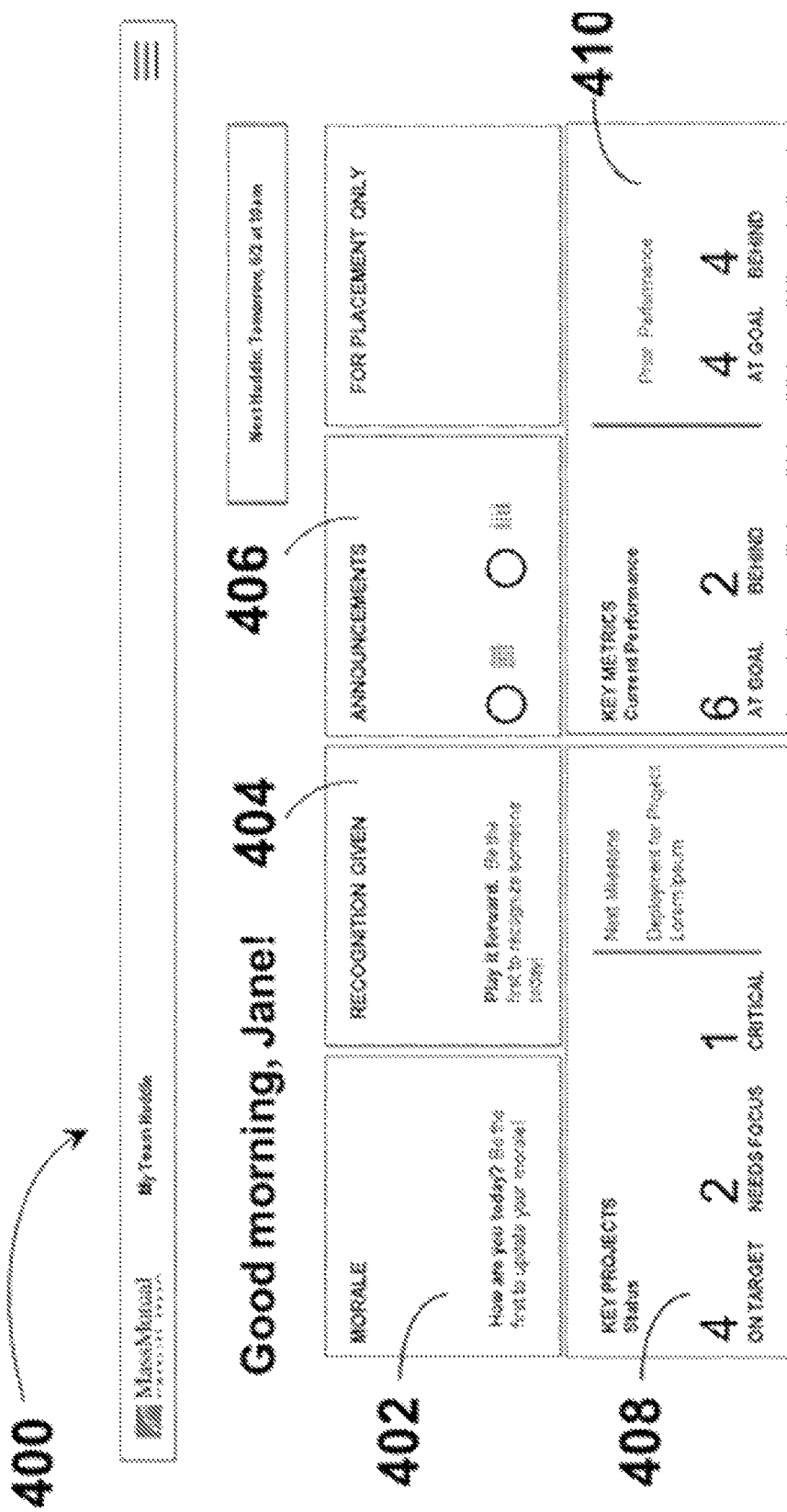
FIG. 4 shows an exemplary user interface of a user's huddle summary, according to a further embodiment.

FIG. 4 shows an exemplary user interface of a user's huddle summary 400, according to a further embodiment.

Huddle summary 400 user interface may be displayed, for example, by a huddle collaboration system as shown in FIG. 1, which may include different components that may dynamically interact with each other through network connections.

According to some embodiments of the present disclosure, huddle summary 400 user interface may enable one or more users, such as a huddle leader and a huddle participant of a company, to preview all the sub-applications in the huddle board, and each sub-application may display a summary-level view of the data it may contain. Huddle summary 400 may include sub-applications which may be part of a standard or preselected set of sub-applications for every user's huddle such as morale 402, recognition 404, announcements 406, company news, and dates/calendar, among others. These standard sub-applications may include pre-defined content and may have standard layout in the huddle board. Morale 402 may be an image and text-based sub-application which may be used by each user to indicate their feeling before every huddle, by selecting an image from a library and expressing an optional statement of, for example less than 140 characters. Recognition 404 may be a text-based sub-application which may be used as a place where users can recognize with a statement of, for example less than 140 characters, anyone they have worked with for exceptional work. Announcements 406 may be a text-based sub-application which may be used for users to share important events and/or news with the rest of the team. Company news may be text-based sub-application which may provide news and alerts relevant to all the company's employees and may also provide significant news that should be communicated to all the huddle members during an active huddle session. Dates/calendar sub-application may be a fillable calendar which may be used as a place for users to share important dates with one another such as out of office dates, team meeting dates, and others.

Huddle summary 400 may also include sub-applications which may be customized by the user, who may be able to decide which sub-applications may be shown, according to the user's and/or project's requirements. Custom sub-applications may contain configurable content and may have a configurable layout in the huddle board, which may be modified by authorized users interacting with a suitable designer mode of operation of the huddle board. These custom sub-applications may include key projects 408, key metrics 410, leader standard work, employee sentiment, customer sentiment, make your own sub-application, and others. Key projects 408 may be a text-based sub-application which may be used as a place to store and track important information about each of the team's key projects. Key metrics 410 may be an image, text and number-based sub-application which may be used as a place to display figures shared by another business area. Leader standard work may be a text-based sub-application which may be used to record the progress on standard work efforts. Employee sentiment may be a text-based sub-application which may be used to view the results of employee surveys. Customer sentiment may be a text-based sub-application which may be used to view the results of customer surveys. Make your own sub-application may allow users to personalize current sub-applications and to create sub-applications from generic sub-applications, according to the user's and/or project's requirements. Huddle leaders may be allowed to use the make your own sub-application to create and/or personalize sub-applications and control to which extent each huddle participant may have permission to create and/or personalize one or more sub-applications.

In huddle summary 400, the huddle leader may have permission to edit and/or manage the configuration of the huddle board which provides the huddle leader with control over the sub-applications that the huddle participants may use in the huddle board, the name of these sub-applications, and any other suitable configuration of the sub-applications which may satisfy the huddle board requirements. The huddle participants may use the sub-applications authorized by the huddle leader for the huddle board, and may have editing and/or viewing rights over the content in one or more sub-applications but may be restricted from editing the configuration of any sub-application. In addition, the huddle leader may configure one or more sub-applications in the huddle board in such a way that huddle participants may have viewing rights over the most recent content in the sub-application, but may be restricted from editing the content in the sub-application. Moreover, one or more sub-applications may be controlled by the system and a user, such as a huddle leader or a huddle participant, may have viewing rights but may be restricted from editing the content and/or configuration of the sub-application, for example, company news may be controlled by the system and its content may vary according to what's important for the user.

Figure 5:
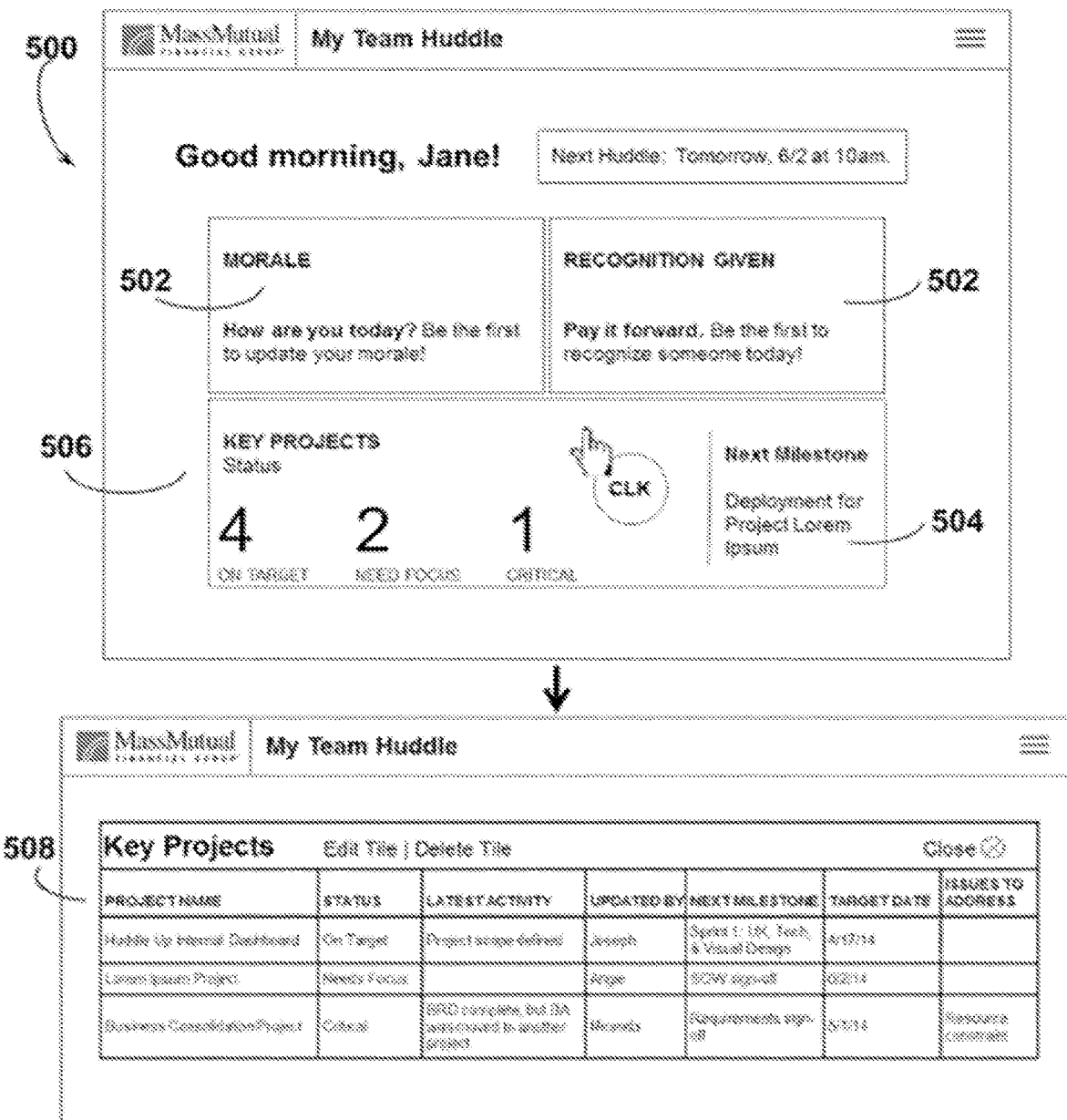
FIG. 5 shows exemplary user interfaces of a sub-application that may be accessed through a user's huddle summary, according to an exemplary embodiment.

FIG. 5 shows exemplary user interfaces 500 of a sub-application that may be accessed through a user's huddle summary, according to an exemplary embodiment.

User interfaces 500 may be displayed, for example, by a huddle collaboration system as shown in FIG. 1, which may include different components that may dynamically interact with each other through network connections.

The content of the huddle board may be available to a huddle leader in an active huddle session and to every user in an inactive huddle, in the form of one or more standard 502 and customized 504 sub-applications which may be displayed in a user's huddle summary 506. Each sub-application in huddle summary 506 may display a summary-level view of the data it may contain. However, if a user may desire to edit and/or view further details of the data in each sub-application, then the user may click on the sub-application and huddle collaboration system may display a user interface with a detailed view 508 of the selected sub-application.

Figure 6:
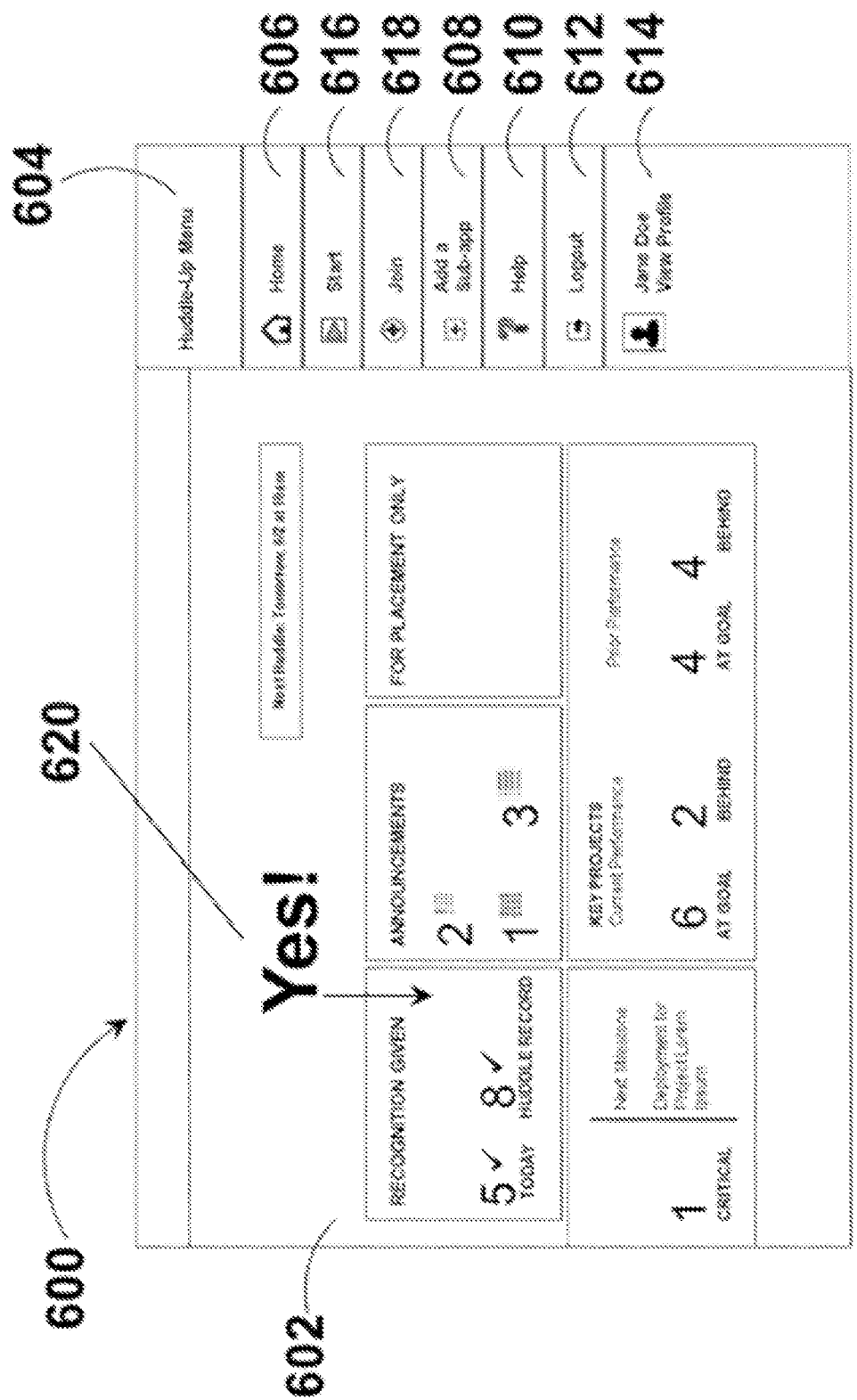
FIG. 6 shows a huddle-up menu of a huddle board summary user interface, according to an exemplary embodiment.

FIG. 6 shows a huddle-up menu 600 of a huddle board summary user interface, according to an exemplary embodiment.

Huddle-up menu 600 may be displayed, for example, by a huddle collaboration system as shown in FIG. 1, which may include different components that may dynamically interact with each other through network connections.

Huddle summary 602 may include a huddle-up menu 600. When selected, huddle-up menu 600 may "push" the page contents to the left (as shown in FIG. 6) to reveal the available huddle-up menu 600. Huddle-up menu 600 may be manually closed, and may close automatically once a selection has been made.

Huddle-up menu 600 may include options 604 that may allow users to return to home screen 606, add a sub-application 608 to the huddle board, display help 610 information, logout 612 of the huddle collaboration system, and view the user's profile 614. Additional options 604 which may be included in the huddle-up menu 600 may include the ability to view changes made to the huddle board as a news feed; mark up the screen with annotations 620 which may be saved as an overlaid of the huddle board, and erase annotations that may have been made using the markup feature, among others.

A graphical representation on the screen may be marked by a team member or leader. The team member or leader uses an input device (e.g., mouse, pen, pointer, keyboard, touchscreen) of their computing device to provide input data that is rendered for display over the huddle board. For example, the leader may use a touchscreen to write a message that is presented on the huddle board screen shown at that time. The message may be a drawing, text, symbol, or other annotation. As the message is being input, each instance of the huddle board automatically synchronizes and displays the message overlaid on the huddle board screen. The message is stored in a huddle collaboration file associated with the particular screen of the huddle board. The screen from this huddle board may be retrieved along with the message. A computing device retrieving the screen may choose whether to include the message.

Huddle-up menu 600 in huddle summary 602 may also allow a huddle leader to start 616 a huddle session to conduct a huddle, and a huddle participant to join 618 a huddle board after the leader has started the huddle. While in an active huddle board, huddle-up menu 600 may also include features that may allow the huddle leader to record a problem, capture screen shots, have a video call with huddle members, and chat with other huddle members, among others.

In an additional embodiment, huddle-up menu 600 may include an option 604 which may allow a huddle member to join 618 an active huddle session as a note taker. The note taker may be a member of the team who may be responsible for taking notes of the information generated during an active huddle session. The note taker may have a personalized user interface of the huddle board generated by huddle collaboration system, which may display the content in the huddle in the form of one or more sub-applications and an additional window on which they may take notes and generate additional documents, such as a to do list, and others. These notes may be saved in internal database for further analysis performed by one or more huddle members and may be displayed in one or more sub-applications when needed. The huddle leader may provide the note taker with viewing and/or editing rights over the content in one or more sub-applications in the huddle board.

Example #1 refers to a company's marketing team joining a huddle employing the method described in FIG. 3. A huddle leader from the marketing team may access the huddle collaboration system by interacting with his laptop computer in a conference room, then he may select the marketing huddle board and the start option in the huddle-up menu, to initiate conducting the huddle, as shown in FIG. 6. At the same time, each huddle participant of the marketing team may access the huddle collaboration system to engage in the huddle session by interacting with their mobile devices, laptop computers, or tablets from the same conference room or remotely from different locations. During the active huddle session, the huddle leader may interact with the huddle collaboration system user interface and may access one or more sub-applications to view and/or edit the content in the huddle board as shown in FIG. 5, while sharing the screen with the huddle participants. Simultaneously, the huddle participants may engage in the huddle session by viewing and/or editing the content in the huddle according to the participant's permissions.

Example #2 refers to a company's marketing team updating a huddle employing the method described in FIG. 3. A huddle participant may access a huddle board to view one or more files saved during the previous huddle, by interacting with the huddle summary generated by the huddle collaboration system. The huddle participant may access the key project sub-application as shown in FIG. 5, review the changes made during last huddle session, and add one or more additional changes which the rest of the team may notice in the huddle board news feed.

Example #3 refers to the customization of the user's huddle summary employing the method described in the present disclosure. A huddle leader of a company's marketing team may create a new sub-application for a custom marketing data table, and may allow huddle participants to use this and other sub-applications such as key projects, key metrics, and customer sentiment, among others. Huddle participants may include in the marketing huddle board the sub-applications authorized by the huddle leader and may opt to customize their huddle summary to show a summary-level description of the key projects and key metrics, as shown in FIG. 4. However, they may access the rest of the available sub-applications in the marketing huddle board through the huddle-up menu available in the huddle summary as shown in FIG. 6. In addition, the huddle participants may review in their huddle summary, standard sub-applications such as morale, recognition, announcements, and company news, among others.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A server-implemented method comprising:
   generating, by a huddle management server, a session associated with a huddle board record for an electronic interaction between a plurality of user computers including a first user computer and a second user computer;
   generating, by the huddle management server during the session, a huddle board display page having a plurality of sub-applications and an association with more than at least one user,
   wherein an initial view of the huddle board display page has information from a first sub-application of the plurality of sub-applications and a second sub-application of the plurality of sub-applications, and wherein the initial view of the huddle board display page has:
      a first huddle board display page having a first link associated with an object of the information from the first sub-application configured to activate a secondary view of the huddle board display page having information from the first sub-application,
      a second huddle board display page having a second link associated with an object of the information from the second sub-application configured to activate a secondary view of the huddle board display page having information from the second sub-application;
   receiving, by the huddle management server, a signal indicating activation of the first or second links displayed by the first huddle board display page or the second huddle board display page;
   upon receiving an indication that a sub-application has been activated by the second user computer in a network communication with the huddle board display page, determining, by the huddle management server, if the second user computer is authorized to activate the sub-application based upon access rights in the huddle board record;
   generating, by the huddle management server, the secondary view of the huddle board display page associated with the activated sub-application based upon the description in the data store and with content generated by the activated sub-application;
   upon receiving an input from the user computer to annotate the secondary view of the huddle board display page, generating, by the huddle management server, a tertiary view of the huddle board display page based upon the description in the data store and content generated by any activated sub-applications including the input of updated information associated with the huddle board display page presented as an overlay on the huddle board display page, and
   associating, by the huddle management server, the input with the first or the second huddle board display page in the huddle board record based on which sub-application was active at the time the input was received.

2. The server-implemented method of claim 1, wherein each of the plurality of sub-applications comprises a pre-defined content and has a standard layout.

3. The server-implemented method of claim 2, wherein the pre-defined content is selected from a group consisting of morale field, recognition field, announcements field, company news field, and calendar field.

4. The server-implemented method of claim 1, wherein at least one sub-application of the plurality of sub-applications corresponds to a software tool enabling remote collaboration between users in a digital huddle environment.

5. The server-implemented method of claim 1, wherein at least one sub-application of the plurality of sub-applications corresponds to an image-based sub-application, wherein the image-based sub-application comprises a library of images for selection by users.

6. The server-implemented method of claim 1, wherein at least one sub-application of the plurality of sub-applications corresponds to a text-based sub-application, wherein the text-based sub-application comprises a text column of a pre-defined characters for writing by users.

7. The server-implemented method of claim 1, wherein at least one sub-application of the plurality of sub-applications corresponds to a text-based sub-application, wherein the text-based sub-application comprises a text column for users to publish text for sharing with other users.

8. The server-implemented method of claim 1, wherein at least one sub-application of the plurality of sub-applications corresponds to a text-based sub-application to provide news and alerts to users during active huddle.

9. The server-implemented method of claim 1, wherein at least one sub-application of the plurality of sub-applications corresponds to a fillable calendar application for users to share dates with one another.

10. The server-implemented method of claim 1, wherein at least one sub-application of the plurality of sub-applications comprises a configurable content editable by users upon authorization.

11. A collaboration system comprising:
    a data store, wherein the data store comprises a description associated with a huddle board display page associated with a huddle board record having a plurality of sub-applications and an association with more than one user,
    wherein an initial view of the huddle board display page has information from a first sub-application of the plurality of sub-applications and a second sub-application of the plurality of sub-applications, and
    wherein the initial view of the huddle board display page comprises:
       a first huddle board display page having a first link associated with an object of the information from the first sub-application configured to activate a secondary huddle board display page having information from the first sub-application, and a second huddle board display page having a second link associated with an object of the information from the second sub-application configured to activate a secondary huddle board display page having information from the second sub-application; and a computer processor coupled to the data store and in communication through the Internet and programmed to:

generate a session associated with the huddle board record for an electronic interaction between a plurality of user computers including a first user computer and a second user computer;

receive a signal indicating activation of the first or second links displayed by the first huddle board display page or the second huddle board display page, upon receiving an indication that a sub-application has been activated by the second user computer in Internet communication with the huddle board display page, determine if the second user computer is authorized to activate the sub-application based upon access rights in the huddle board record;

serve the secondary view of the huddle board display page associated with the activated sub-application based upon the description in the data store and with content generated by the activated sub-application, upon receiving an input from the user computer to annotate the secondary view of the huddle board display page, serve a tertiary view of the huddle board display page based upon the description in the data store, and including content generated by any activated sub-applications associated with the huddle board display page and the input presented as an overlay on the huddle board display page, wherein the input includes updated information associated with the huddle board display page, and associate the input with the first or the second huddle board display page in the huddle board record based on which sub-application was active at the time the input was received.

12. The collaboration system of claim 11, wherein at least one sub-application of the plurality of sub-applications corresponds to a software tool enabling remote collaboration between users in a digital huddle environment.

13. The collaboration system of claim 11, wherein at least one sub-application of the plurality of sub-applications corresponds to an image-based sub-application, wherein the image-based sub-application comprises a library of images for selection by users.

14. The collaboration system of claim 11, wherein at least one sub-application of the plurality of sub-applications corresponds to a text-based sub-application, wherein the text-based sub-application comprises a text column of a pre-defined characters for writing by users.

15. The collaboration system of claim 11, wherein at least one sub-application of the plurality of sub-applications corresponds to a text-based sub-application, wherein the text-based sub-application comprises a text column for users to publish text for sharing with other users.

16. The collaboration system of claim 11, wherein at least one sub-application of the plurality of sub-applications corresponds to a text-based sub-application to provide news and alerts to users during active huddle.

17. The collaboration system of claim 11, wherein at least one sub-application of the plurality of sub-applications corresponds to a fillable calendar application for users to share dates with one another.

18. The collaboration system of claim 11, wherein at least one sub-application of the plurality of sub-applications comprises a configurable content editable by users upon authorization.

19. The collaboration system of claim 11, wherein at least one sub-application of the plurality of sub-applications comprises a pre-defined content and has a standard layout.

20. The collaboration system of claim 19, wherein the pre-defined content is selected from a group consisting of a morale field, a recognition field, an announcements field, a company news field, and a calendar field.

* * * * *